United States Patent
Kono et al.

(10) Patent No.: US 12,259,248 B2
(45) Date of Patent: Mar. 25, 2025

(54) INFORMATION PROCESSING DEVICE, SYSTEM, AND METHOD

(71) Applicant: TOYOTA JIDOSHA KABUSHIKI KAISHA, Toyota (JP)

(72) Inventors: Katsumi Kono, Toyota (JP); Yuuichi Kohara, Toyota (JP); Yuki Hirooka, Chofu (JP); Osamu Kaneko, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 18/147,795

(22) Filed: Dec. 29, 2022

(65) Prior Publication Data

US 2023/0280168 A1 Sep. 7, 2023

(30) Foreign Application Priority Data

Mar. 2, 2022 (JP) ................................. 2022-031917

(51) Int. Cl.
*G01C 21/34* (2006.01)
*B60W 20/15* (2016.01)

(52) U.S. Cl.
CPC ........... *G01C 21/343* (2013.01); *B60W 20/15* (2016.01); *G01C 21/3469* (2013.01)

(58) Field of Classification Search
CPC .. G01C 21/343; G01C 21/3469; B60W 20/15
See application file for complete search history.

(56) References Cited

U.S. PATENT DOCUMENTS

| | | | | |
|---|---|---|---|---|
| 2006/0161335 A1* | 7/2006 | Beinhaker | .......... | G01C 21/3492 701/532 |
| 2007/0294026 A1 | 12/2007 | Schirmer | | |
| 2010/0131139 A1* | 5/2010 | Sakai | .......... | B60K 6/46 903/903 |
| 2011/0279255 A1* | 11/2011 | Miyoshi | ............. | G01C 21/3469 701/532 |
| 2015/0362324 A1* | 12/2015 | Jin | ...................... | G01C 21/3469 701/123 |

(Continued)

FOREIGN PATENT DOCUMENTS

| | | |
|---|---|---|
| JP | 2002-170197 A | 6/2002 |
| JP | 2004-282848 A | 10/2004 |

(Continued)

OTHER PUBLICATIONS

U.S. Appl. No. 18/069,256, filed Dec. 21, 2022, Katsumi Kono et al.

*Primary Examiner* — Khoi H Tran
*Assistant Examiner* — Tristan J Greiner
(74) *Attorney, Agent, or Firm* — Oblon, McClelland, Maier & Neustadt, L.L.P.

(57) ABSTRACT

An information processing device that determines a route by which a circuit of a plurality of points is made includes an acquisition unit that acquires point information regarding the points, a determination unit that determines a circuit route that satisfies a first condition for the points based on the point information acquired by the acquisition unit and traffic information, and a transmission unit that transmits the circuit route determined by the determination unit to the outside.

4 Claims, 14 Drawing Sheets

(56) References Cited

U.S. PATENT DOCUMENTS

| | | | | |
|---|---|---|---|---|
| 2017/0232952 | A1* | 8/2017 | Blasinski | B60K 6/48 |
| | | | | 701/22 |
| 2020/0124429 | A1* | 4/2020 | Zhang | G06Q 10/047 |
| 2020/0130670 | A1* | 4/2020 | Ogawa | B60W 20/13 |
| 2020/0349509 | A1 | 11/2020 | Sharma et al. | |

FOREIGN PATENT DOCUMENTS

| | | |
|---|---|---|
| JP | 2007-276761 A | 10/2007 |
| JP | 2011-27472 A | 2/2011 |
| JP | 2020-67677 A | 4/2020 |
| JP | 2021-36417 A | 3/2021 |

\* cited by examiner

| | DELIVERY DESTINATION DATA | | |
|---|---|---|---|
| CIRCUIT POINT | DELIVERY DESTINATION NAME | ADDRESS | |
| a | ... | ........... | |
| b | ... | ........... | |
| c | ... | ........... | |
| d | ... | ........... | |
| e | ... | ........... | |
| f | ... | ........... | |
| g | ... | ........... | |
| h | ... | ........... | |

| ROAD/TRAFFIC ENVIRONMENT DATA | | | | |
|---|---|---|---|---|
| ROUTE | ROAD TYPE | AVERAGE VEHICLE SPEED | DISTANCE | |
| BASE — a | GENERAL ROAD | ... | ... | |
| BASE — b | GENERAL ROAD | ... | ... | |
| BASE — d | GENERAL ROAD | ... | ... | |
| BASE — d | HIGHWAY | ... | ... | |
| BASE — f | GENERAL ROAD | ... | ... | |
| a — b | GENERAL ROAD | ... | ... | |
| a — c | GENERAL ROAD | ... | ... | |
| a — d | GENERAL ROAD | ... | ... | |
| a — e | GENERAL ROAD | ... | ... | |
| b — c | GENERAL ROAD | ... | ... | |
| b — e | GENERAL ROAD | ... | ... | |
| b — f | GENERAL ROAD | ... | ... | |
| c — d | HIGHWAY | ... | ... | |
| c — e | GENERAL ROAD | ... | ... | |
| c — e | HIGHWAY | ... | ... | |
| c — g | GENERAL ROAD | ... | ... | |
| ⋮ | ⋮ | ⋮ | ⋮ | |

152

INFORMATION PROCESSING DEVICE, SYSTEM, AND METHOD

CROSS-REFERENCE TO RELATED APPLICATION

This application claims priority to Japanese Patent Application No. 2022-031917 filed on Mar. 2, 2022, incorporated herein by reference in its entirety.

BACKGROUND

1. Technical Field

The present disclosure relates to an information processing device or the like that provides a vehicle with information regarding travel.

2. Description of Related Art

In parcel delivery services and the like, it is important to appropriately manage delivery plans regarding travel routes, visit times, and the like such that delivery vehicles can be used efficiently.

Japanese Unexamined Patent Application Publication No. 2020-067677 (JP 2020-067677 A) discloses a system for managing deliveries by vehicle. In JP 2020-067677 A, it is outlined that a delivery vehicle can be used efficiently by formulating a delivery plan based on vehicle stoppage information and the length of time a vehicle stays at visited points, in addition to map information and past delivery records, and by operating the vehicle according to the formulated delivery plan.

SUMMARY

In a hybrid vehicle equipped with an electric motor and an internal combustion engine, it is possible to improve fuel efficiency through travel control that efficiently and selectively uses the electric motor and the internal combustion engine. When using the hybrid vehicle as a delivery vehicle for parcel delivery services, rather than focusing only on efficient circuit routes for the delivery vehicle, it is desirable to improve fuel efficiency by optimally utilizing both traveling using the electric motor and traveling using the internal combustion engine. Thus, there is room for further improvement in the method of determining the circuit route of a delivery vehicle.

The present disclosure provides an information processing device and the like that can determine a circuit route suitable for improving fuel efficiency in a hybrid vehicle.

An information processing device according to an aspect of the present disclosure determines a route by which a circuit of a plurality of points is made. The information processing device includes an acquisition unit, a determination unit, and a transmission unit. The acquisition unit is configured to acquire point information regarding the points. The determination unit is configured to determine a circuit route that satisfies a first condition for the points based on the point information acquired by the acquisition unit, and traffic information. The transmission unit is configured to transmit the circuit route determined by the determination unit to an outside.

With each aspect of the present disclosure, it is possible to determine a circuit route suitable for improving fuel efficiency in a hybrid vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein

FIG. 4 is an example of road/traffic environment data;

DETAILED DESCRIPTION OF EMBODIMENTS

An information processing device according to the present embodiment determines the optimal route for a hybrid vehicle by which a circuit of a plurality of points is made based on information regarding each point and real-time traffic information such that the vehicle consumes the least amount of fuel, taking into consideration both low-speed traveling with electric motor driving and high-speed traveling with internal combustion engine driving. As a result, the fuel efficiency of the hybrid vehicle is improved.

Hereinafter, an embodiment of the present disclosure will be described with reference to the drawings.

Embodiment

System Configuration

Figure 1:
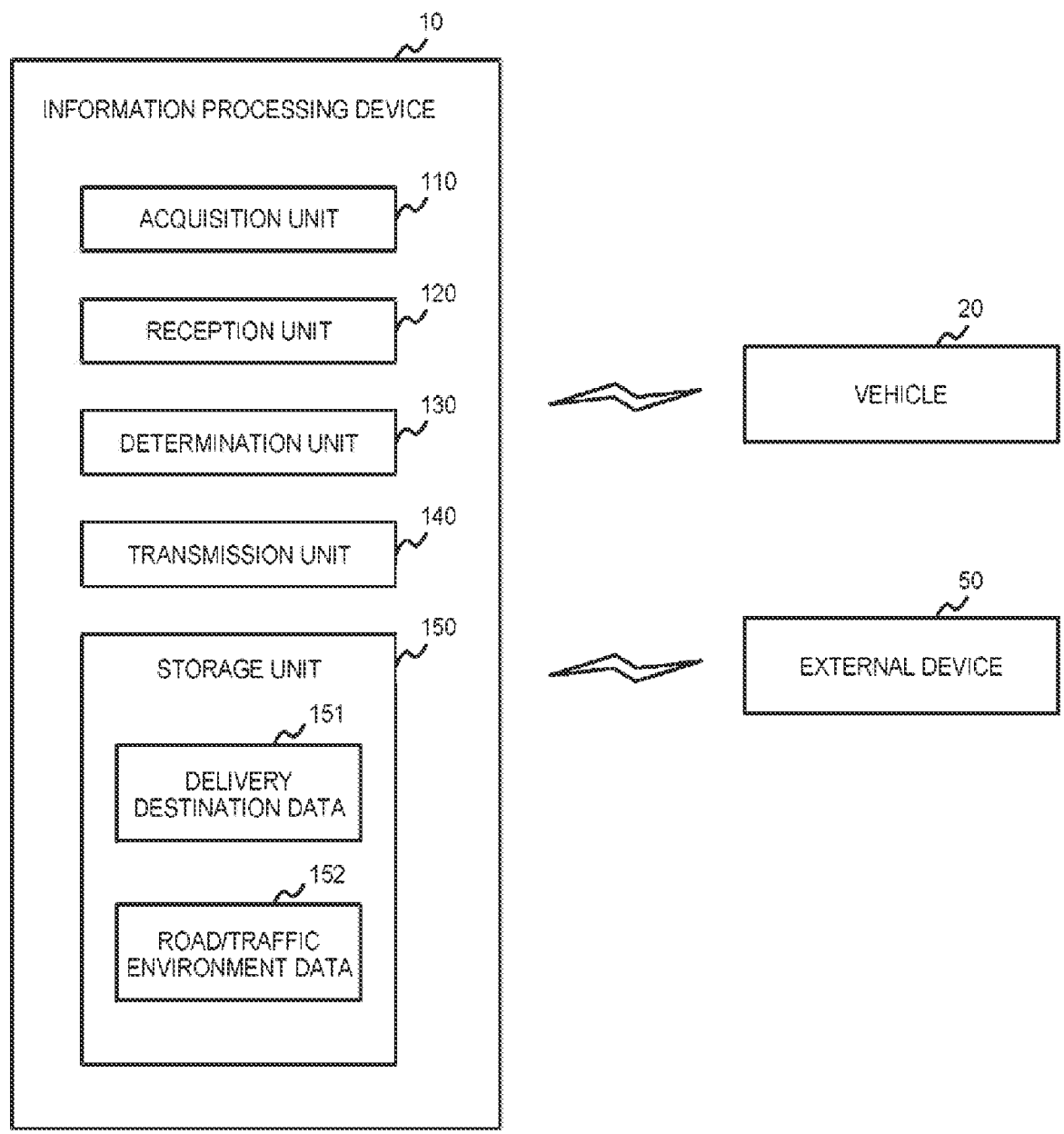
FIG. 1 is a schematic configuration diagram of a system including an information processing device according to an embodiment of the present disclosure.

FIG. 1 is a schematic diagram illustrating a configuration of a system including an information processing device 10 according to an embodiment of the present disclosure. In the system illustrated in FIG. 1, the information processing device 10 is configured to be capable of wireless communication with a vehicle 20 and an external device 50.

The vehicle 20 is a delivery vehicle that is used for a service that travels around a plurality of predetermined delivery destinations (hereinafter referred to as "circuit points"), such as a parcel delivery service or a vending machine product replenishment service. The vehicle 20 of the present embodiment is an automobile equipped with an electric motor (motor) and an internal combustion engine as power sources, and implements efficient circuit travel passing through circuit points based on information provided from the information processing device 10.

Figures 2, 3:
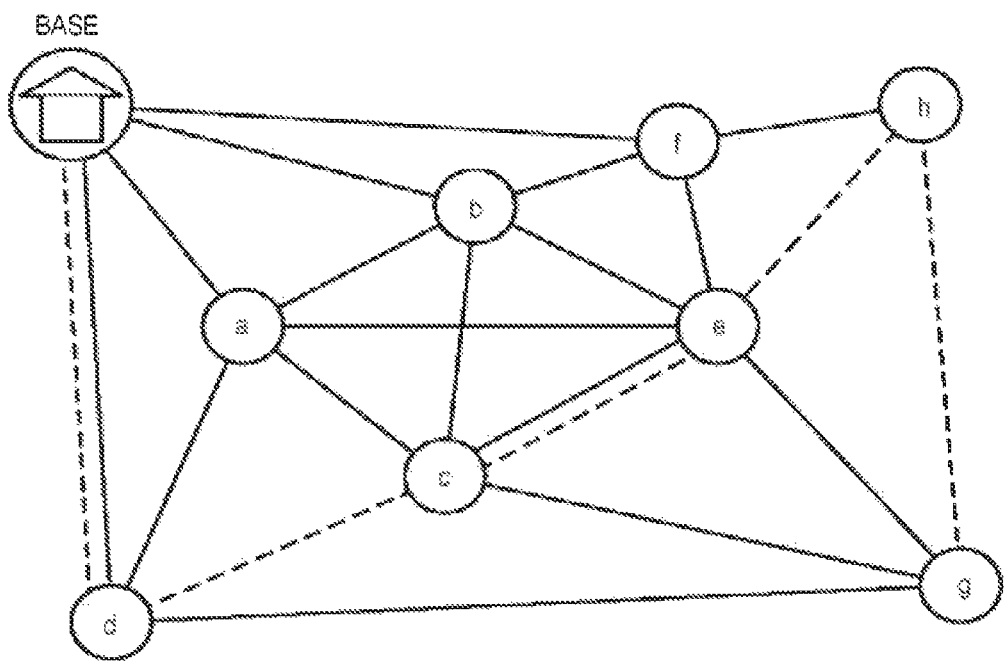
FIG. 2 is an example of circuit points to which a vehicle travels.
FIG. 3 is an example of delivery destination data.

FIG. 2 illustrates an example in which there are eight circuit points a to h as circuit points through which the vehicle 20 travels, with a base such as a service office as a departure point and an arrival point. In FIG. 2, a plurality of links connecting circuit points are routes on which the vehicle 20 can travel. Links indicated by straight lines represent urban roads and the like (hereinafter referred to as "general roads") on which a vehicle exclusively travels at low speed, and links indicated by broken lines represent highways, bypass roads, and the like (hereinafter referred to as "highways") on which a vehicle exclusively travels at high speed.

The external device 50 is a device capable of providing the vehicle 20 with various pieces of information (traffic information) regarding a travel route of the vehicle 20, such as road congestion conditions, construction/traffic restrictions, and the like, in real time. Alternatively, the external device 50 may provide the vehicle 20 with traffic information predicted based on the past vehicle travel history.

The information processing device 10 is a device for deriving the optimal order of circuit points for the vehicle 20 by which a circuit of a plurality of circuit points is made. The information processing device 10 is built in a server owned by, for example, a service provider, a management company, or the like. The information processing device 10 includes an acquisition unit 110, a reception unit 120, a determination unit 130, a transmission unit 140, and a storage unit 150.

The acquisition unit 110 acquires information (hereinafter referred to as "point information") regarding the circuit points from the storage unit 150. This point information will be described below. The reception unit 120 receives real-time traffic information regarding the travel route of the vehicle 20 from the external device 50. The determination unit 130 determines a circuit route indicating the optimal order of circuit points for the vehicle 20 by which the circuit of the circuit points is made based on the point information acquired by the acquisition unit 110 and the traffic information received by the reception unit 120. A method of determining the circuit route will be described below. The transmission unit 140 transmits the circuit route determined by the determination unit 130 to the vehicle 20. The storage unit 150 stores delivery destination data 151 and road/traffic environment data 152 as the point information.

The delivery destination data 151 is data indicating information on the circuit points that are delivery destinations. FIG. 3 illustrates an example of the delivery destination data 151 corresponding to the eight circuit points a to h illustrated in FIG. 2. The delivery destination data 151 illustrated in FIG. 3 stores the name and address of the delivery destinations for each circuit point. This delivery destination data 151 is created, for example, by being input via a terminal or smartphone of a service provider, a management company, or the like. In addition, when there are a plurality of vehicles 20 used for the service, one piece of delivery destination data 151 shared by the vehicles 20 may be stored, or a plurality of pieces of delivery destination data 151 respectively corresponding to the vehicles 20 may be stored.

The road/traffic environment data 152 is data indicating information regarding routes between two circuit points that the vehicle can travel to from among a plurality of circuit points. FIG. 4 illustrates an example of the road/traffic environment data 152 corresponding to the eight circuit points a to h illustrated in FIG. 2. The road/traffic environment data 152 illustrated in FIG. 4 stores road types, average vehicle speeds, distances, and the like for routes between circuit points. The road type indicates whether the information is information for traveling the route between the circuit points on general roads (straight line link in FIG. 2) or information for traveling on highways (broken line links in FIG. 2). As an example, "c-e" between the circuit point c and the circuit point e indicates that the vehicle can travel on both general roads and highways. The average vehicle speed is the average value of the speed when the vehicle 20 travels on the route between the circuit points, and is calculated based on the characteristics (road width, number of lanes, speed regulation, and the like) of the route and the road type. The distance is the actual traveling distance of the route between the circuit points, and is calculated based on map data or the like. The road/traffic environment data 152 may include information on the gradient and the number of traffic lights.

The acquisition unit 110 may acquire one or both of the delivery destination data 151 and the road/traffic environment data 152 from a configuration other than the information processing device 10, instead of from the storage unit 150.

The information processing device 10 is typically configured by a computer having a memory, a processor, and an interface. The processor of the information processing device 10 implements each function by, for example, reading and executing a program stored in a non-temporary memory.

Processing of Information Processing Device

Figure 5:
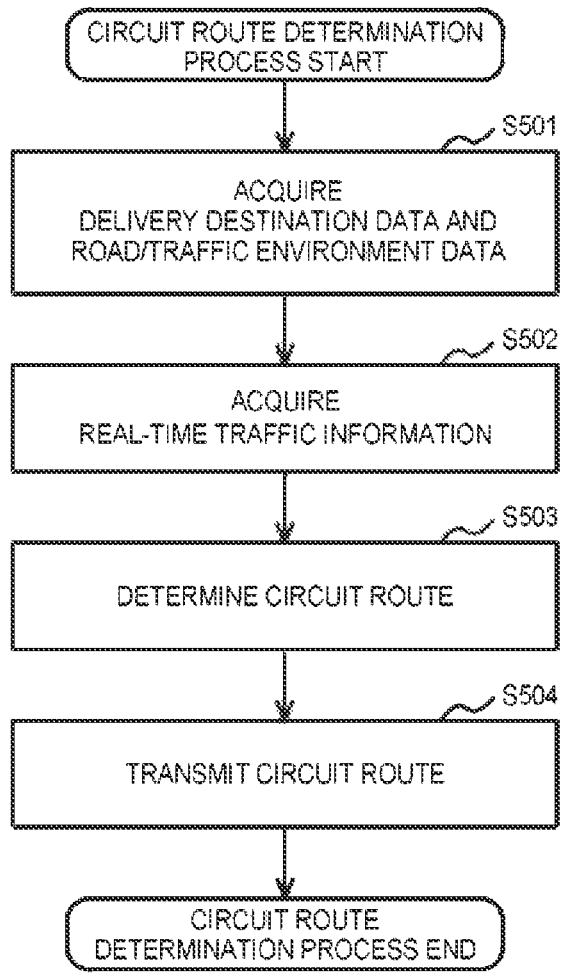
FIG. 5 is a flowchart of a circuit route determination process executed by a travel control device.

An example of processing executed by the information processing device 10 according to the present embodiment will be described below with further reference to FIG. 5. FIG. 5 is a flowchart illustrating an example of a circuit route determination process executed by the information processing device 10. The circuit route determination process is executed, for example, before the delivery service provided by the vehicle 20 is started.

Step S501

The acquisition unit 110 acquires the delivery destination data 151 and the road/traffic environment data 152 as point information regarding the circuit points. When each piece of data is stored in the storage unit 150, the acquisition unit 110 acquires each piece of data from the storage unit 150. When each piece of data is not stored in the storage unit 150, the acquisition unit 110 may acquire each piece of data from a device storing the data or by manual input by a driver of the vehicle 20. When the delivery destination data 151 and the road/traffic environment data 152 are acquired by the acquisition unit 110, the process proceeds to step S502.

Step S502

The reception unit 120 receives real-time traffic information regarding the travel route of the vehicle 20 from the external device 50. The reception unit 120 can sequentially receive real-time traffic information from the external device 50 regardless of whether the acquisition unit 110 acquires the delivery destination data 151 and the road/traffic environment data 152 in step S501. Therefore, the processing of step S501 and the processing of step S502 may be performed in reverse order. When real-time traffic information is acquired by the reception unit 120, the process proceeds to step S503.

Step S503

The determination unit 130 determines a circuit path that indicates the optimal order of circuit points for the vehicle 20 by which a circuit of the circuit points is made based on the point information acquired by the acquisition unit 110 and the traffic information received by the reception unit 120. A method (so-called all possible combinations method) of extracting all combination routes that enable travel to all circuit points without omission, and determining the route (route that satisfies a first condition) that minimizes the fuel consumption amount of the vehicle 20 when a specific vehicle control is activated from among all of the combination routes can be exemplified as a specific method of determining the circuit route. Here, the specific vehicle control refers to control in which fuel is consumed to generate electrical energy during high-speed traveling where system efficiency (efficiency of the internal combustion engine) is high, and the generated electrical energy is consumed by an electric motor during low-speed traveling where system efficiency is low.

Figure 6:
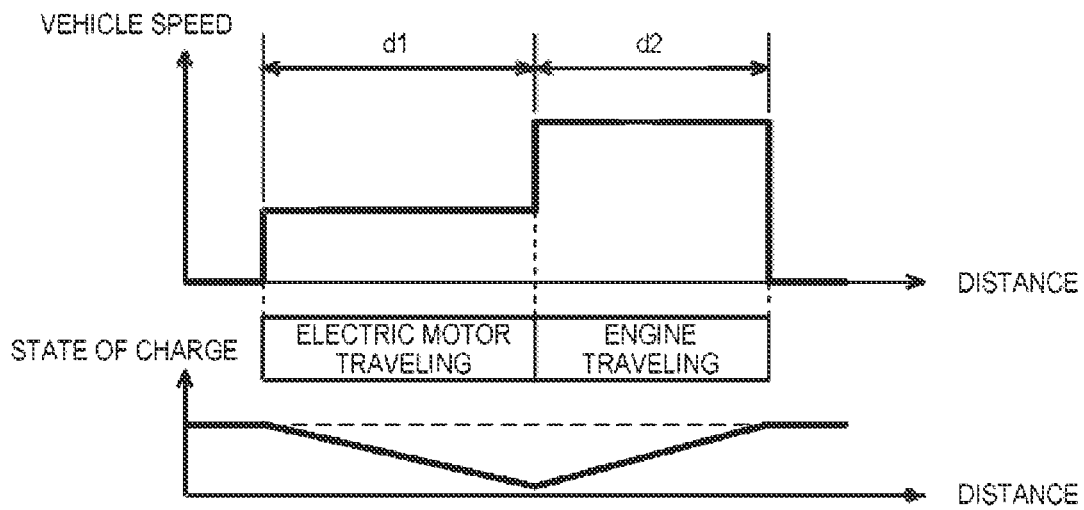
FIG. 6 is an example of a functional model of vehicle traveling.

FIG. 6 is a diagram for illustrating how the fuel consumption amount of the vehicle 20 is reduced by specific vehicle control. FIG. 6 is a functional model of vehicle travel simplified to facilitate easier understanding of the effect, in which a vehicle first travels a distance d1 at low speed and then travels a distance d2 at high speed. In the present embodiment, in the functional model illustrated in FIG. 6, vehicle control is implemented such that the electric motor is used when the vehicle 20 travels the distance d1 at low speed, and the amount of energy consumed by driving the electric motor is obtained by consuming fuel during the period of the distance d2 in which the vehicle travels at high speed using an internal combustion engine. Similarly, in a functional model of vehicle travel to which the vehicle first travels the distance d2 at high speed and then travels the distance d1 at low speed, vehicle control is implemented such that the amount of energy that is expected to be consumed when the electric motor is used when the vehicle 20 travels the distance d1 at low speed is obtained in advance by consuming fuel during the period when the internal combustion engine is used when the vehicle 20 travels the distance d2 at high speed.

When the ratio of the traveling time using the internal combustion engine and the traveling time using the electric motor during low-speed traveling (distance d1) without specific vehicle control of the related art is set as k:(1−k), compared to the case of the present embodiment in which the electric motor is used for all of the low-speed traveling (distance d1), the amount of energy consumed by the system can be reduced by an amount of energy E obtained by the following formula [1]. The variables in the following formula [1] are respectively a fuel consumption energy amount Ce1 per unit traveling distance by the internal combustion engine during low-speed traveling, a fuel consumption energy amount Ce2 per unit traveling distance by the internal combustion engine during high-speed traveling, and an electric power consumption energy amount Cm per unit traveling distance by the electric motor during low-speed traveling.

$$\begin{aligned} E &= \{\text{Energy consumption amount of control of the related art}\} - \quad [1] \\ &\quad \{\text{Energy consumption amount of this control}\} \\ &= \{(Ce2 \times d2) + (Ce1 \times d1 \times k) + (Cm \times d1 \times (1-k))\} - \\ &\quad \{(Ce2 \times d2) + (Cm \times d1)\} \\ &= (Ce1 - Cm) \times d1 \times k \end{aligned}$$

The determination unit 130 applies the specific vehicle control for all combination routes to calculate the fuel consumption energy amount and the electric power consumption energy amount, and then determines the route that minimizes the total fuel consumption amount of the vehicle 20 from the calculation result as the circuit route of the vehicle 20. When the circuit route is determined, the process proceeds to step S504.

Step S504

The transmission unit 140 transmits the circuit route determined by the determination unit 130 to the vehicle 20. The transmission of the circuit route to the vehicle 20 is based on the assumption that the circuit route is automatically set by a device mounted on the vehicle 20, for example. However, when a driver or the like manually sets the circuit route of the vehicle 20, the circuit route may be transmitted to the driver's smartphone or the like. When the circuit route is transmitted, the circuit route determination process ends.

Through the processing of the information processing device 10, it is possible to determine a circuit route that is suitable for improving fuel efficiency in a hybrid vehicle without pre-reading the vehicle travel route from past travel history, navigation information, or the like.

Figure 7:
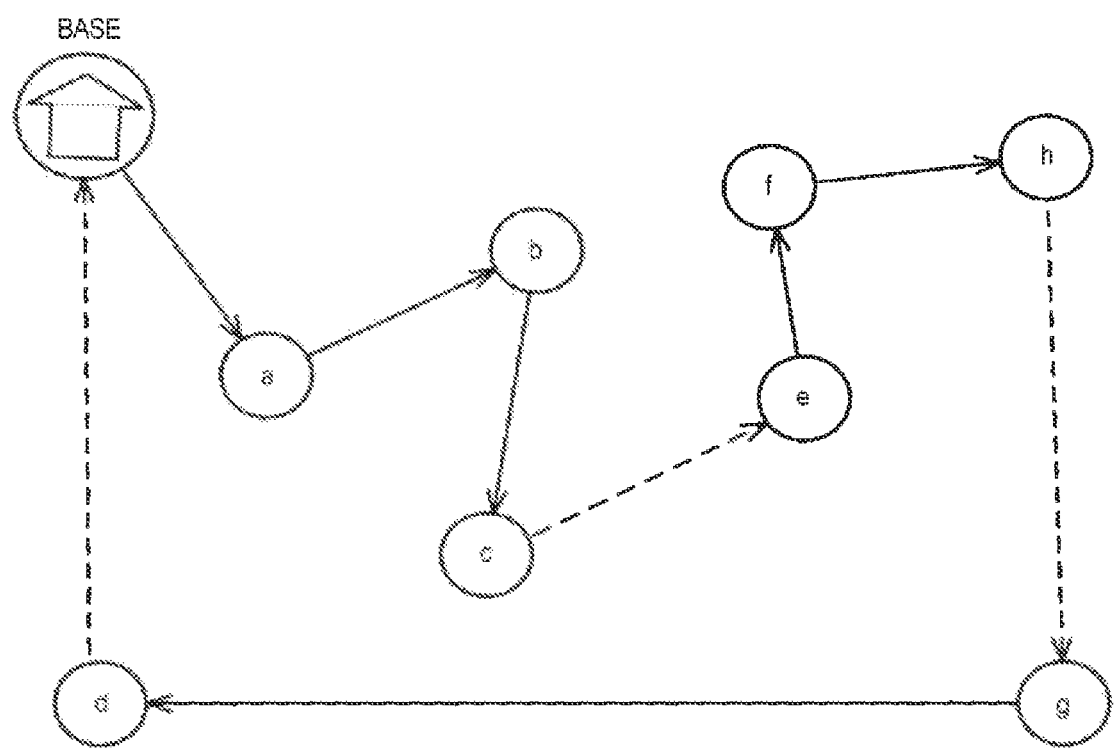
FIG. 7 is an example of a circuit route determined by the information processing device.

FIG. 7 is a diagram illustrating an example of the circuit route determined by the determination unit 130. The example of FIG. 7 illustrates a circuit route in which the vehicle completes a circuit in the order of base→circuit point a→circuit point b→circuit point c→circuit point e→circuit point f→circuit point h→circuit point g→circuit point d→base, and the vehicle travels the routes between the circuit points c-e, between the circuit points h-g, and between the circuit point d and the base on expressways and travels the routes between the other circuit points on general roads.

In the embodiment, an example is shown in which one vehicle 20 makes the circuit of all the circuit points a to h. However, when two or more vehicles 20 cooperate to make the circuit of the circuit points a to h, for example, the circuit route of each vehicle 20 may be determined appropriately such that the total fuel consumption amount of each vehicle 20 is minimized. As an example, it is conceivable to allocate circuit points such that all vehicles 20 can travel on both general roads and highways.

The circuit route determined by the information processing device 10 is used in the vehicle 20 of a transmission destination. An example of a method of using a circuit route in the vehicle 20 will be described below with reference to FIG. 8 and subsequent figures.

Vehicle Configuration

Figure 8:
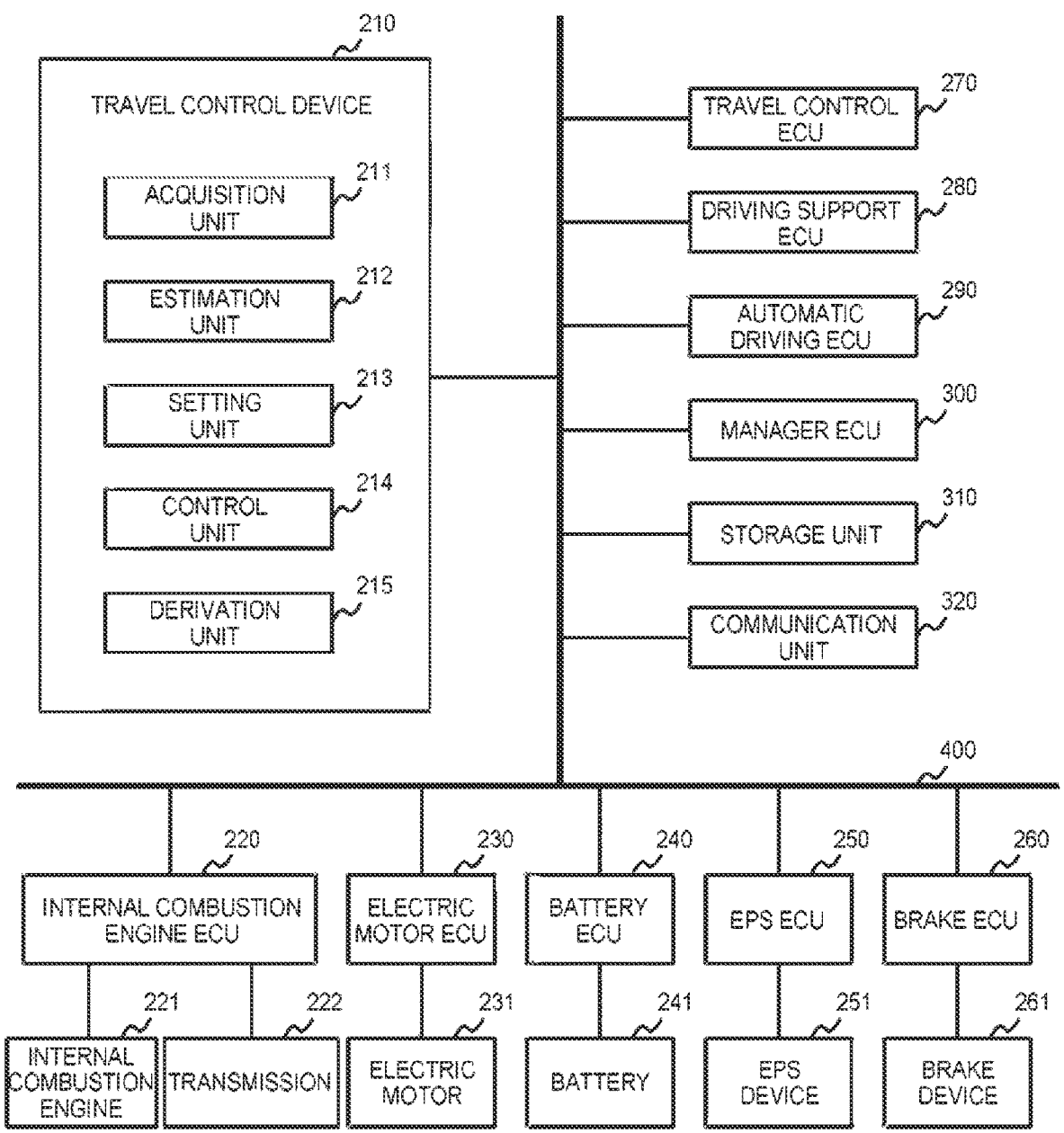
FIG. 8 is a functional block diagram of a vehicle according to the embodiment of the present disclosure.

FIG. 8 is a diagram illustrating an example of functional blocks of the vehicle 20 according to the embodiment of the present disclosure. As illustrated in FIG. 8, the vehicle 20 is equipped with a travel control device 210, an internal combustion engine ECU 220, an internal combustion engine 221, a transmission 222, an electric motor ECU 230, an electric motor 231, a battery ECU 240, a battery 241, an EPS ECU 250, an EPS device 251, a brake ECU 260, a brake device 261, a travel control ECU 270, a driving support ECU 280, an automatic driving ECU 290, a manager ECU 300, a storage unit 310, and a communication unit 320. Each configuration is communicably connected via an in-vehicle network 400 such as controller area network (CAN) or Ethernet (registered trademark).

In addition to the configuration, the vehicle 20 may be equipped with various sensors such as an accelerator pedal sensor, a brake pedal sensor, a camera or an obstacle sensor, a vehicle speed sensor, a yaw rate sensor, and a GPS sensor, and various devices such as a navigation system, but the illustrations thereof are omitted in the present disclosure.

The internal combustion engine 221 and the electric motor 231 are actuators (ACTs) that serve as power sources for driving the vehicle 20. The electric motor 231 is also a generator that generates electric power, and a braking device that generates braking force by regenerative braking when the vehicle 20 is decelerating or running downhill.

The internal combustion engine ECU 220 is an electric control unit (ECU) that controls the internal combustion engine 221 and the transmission 222 that changes the rotation speed between input and output to generate driving torque and braking torque by engine braking.

The electric motor ECU 230 is an electric control unit that controls the electric motor 231 to generate drive torque and generate braking torque by regenerative braking.

The battery 241 is a rechargeable secondary battery (lithium ion battery, nickel hydride battery, lead storage battery, or the like). The battery 241 can supply electric power to the electric motor 231 and other equipment by discharging, and can be charged with the electric power (recovered energy) obtained by regenerative braking of the electric motor 231 or the electric power (generated energy) obtained by a power-running operation using the internal combustion engine 221. The battery ECU 240 is an electric control unit that controls charging and discharging of the electric power of the battery 241.

The electric power steering (EPS) device 251 is an actuator that performs steering to change a traveling direction of the vehicle 20 by changing the steering angle of wheels. The EPS ECU 250 is an electric control unit that controls the EPS device 251.

The brake device (foot brake device) 261 is an actuator that generates braking force by applying a frictional force on a member that rotates with the wheel. The brake ECU 260 is an electric control unit that controls the brake device 261.

The travel control ECU 270 is an electric control unit that controls the internal combustion engine ECU 220 and the electric motor ECU 230 according to traveling modes, which will be described below.

The driving support ECU 280 is an electric control unit that performs various functions for assisting the driving of the vehicle 20, such as collision avoidance (PCS), preceding vehicle following (ACC), lane keeping (LKA), and lane departure warning (LDW). The driving support ECU 280 outputs instructions for controlling the movement of the vehicle 20, such as acceleration/deceleration and steering angle, based on information of the vehicle 20 obtained from various sensors. The functions and number of the driving support ECUs 280 are not limited.

The automatic driving ECU 290 is an electric control unit that performs the functions of automatic driving. The automatic driving ECU 290 outputs instructions for controlling the movement of the vehicle 20, such as acceleration/deceleration and steering angle, in order to execute automatic driving functions based on information of the vehicle 20 obtained from various sensors.

The manager ECU 300 is an electric control unit that issues instructions to the EPS ECU 250, the brake ECU 260, the travel control ECU 270, and the like (hereinafter, these ECUs are collectively referred to as "actuator ECUs") based on instructions from the driving support ECU 280, the automatic driving ECU 290, and the like. For example, the manager ECU 300 issues acceleration instructions to the travel control ECU 270, steering instructions to the EPS ECU 250, and deceleration instructions to the travel control ECU 270 and the brake ECU 260.

When instructions are received from a plurality of driving support ECUs 280 or the like, the manager ECU 300 performs a process called arbitration for determining which instruction to use to control the vehicle 20 based on a predetermined rule, and issues an instruction to the actuator ECU based on the result of the arbitration. The contents of the driving operation provided to the steering wheel, the brake pedal, the accelerator pedal, and the like manually performed by a driver or the like may be acquired by the manager ECU 300 and may be subject to arbitration processing by the manager ECU 300, or may be acquired by the actuator ECU, and then the actuator ECU may arbitrate the driver's manual driving operation and the instructions from the manager ECU 300 separately.

The storage unit 310 stores the travel histories regarding the vehicle 20. One of the travel histories is a history of the vehicle 20 having traveled in the past, which is information on the traveling power generated in the power source (the internal combustion engine 221 and the electric motor 231) at each point in time during a period in which the vehicle 20 was driven. The traveling power consists of the drive power of the internal combustion engine 221, the drive power of the electric motor 231, and the absorption power of the electric motor 231. In addition, one of the travel histories is information on the speed (vehicle speed) of the vehicle 20 at each point in time during a period in which the vehicle 20 was driven in the past. The travel history can be generated by, for example, periodically storing the traveling power and speed of the vehicle 20 derived and acquired based on the various sensors equipped in the vehicle 20 in the storage unit 310 while the power system (not illustrated) of the vehicle 20 is in an ON state. The storage unit 310 may be provided, for example, as part of a navigation system (not illustrated) installed in the vehicle 20.

The communication unit 320 is capable of wireless communication with the information processing device 10 and the external device 50, as well as a server outside the vehicle and other vehicles (not illustrated), and can receive non-driver travel histories based on traveling results of other vehicles.

The travel control device 210 is an electric control unit (ECU) that controls travel of the vehicle 20. The travel control device 210 includes an acquisition unit 211, an estimation unit 212, a setting unit 213, a control unit 214, and a derivation unit 215.

The acquisition unit 211 acquires the information about the circuit route of the vehicle 20 received from the information processing device 10 and the target state of charge of the battery 241 when the vehicle travels on the circuit route and returns to the base. The estimation unit 212 estimates the expected amount of generated energy, which is the energy that can be generated in the vehicle 20, based on the information acquired by the acquisition unit 211. The setting unit 213 sets a section in which the electric motor 231 is used for traveling and a section in which the internal combustion engine 221 is used for traveling based on the expected amount of generated energy estimated by the estimation unit 212 and the target state of charge. The control unit 214 controls traveling of the vehicle 20 based on the section set by the setting unit 213. The derivation unit 215 derives the deviation between the traveling power based on the travel history and the traveling power based on the actual traveling.

Each ECU of the vehicle 20 is typically composed of a computer having a memory, a processor, and an interface. The processor of each ECU implements each function by reading and executing a program stored in a non-temporary memory, for example. The ECUs are connected to each other by communication lines, and can operate cooperatively by appropriately communicating with each other.

The configuration of the devices mounted on the vehicle 20 and the configuration of the travel control device 210 described above are merely examples, and additions, replacements, changes, and omissions can be made as appropriate. In addition, the functions of each device can be implemented by being appropriately integrated into one device or distributed among a plurality of devices.

For example, the travel control device 210 may be provided as an independent ECU, or may be provided as part of the manager ECU 300 or the travel control ECU 270. In addition, the functions of the travel control device 210 may be distributed to the manager ECU 300, the travel control ECU 270, or the like.

Further, for example, the travel control device 210, the travel control ECU 270, the driving support ECU 280, the automatic driving ECU 290, the manager ECU 300, and the like may be provided as one ECU. In addition, for example, the automatic driving ECU 290 does not have to be provided in the vehicle 20.

Control and Processing of Travel Control Device

An example of the control and processing executed by the travel control device 210 according to the present embodiment will be described in detail below with further reference to FIGS. 9A, 9B, 10A, 10B, and 11.

Figure 9A:
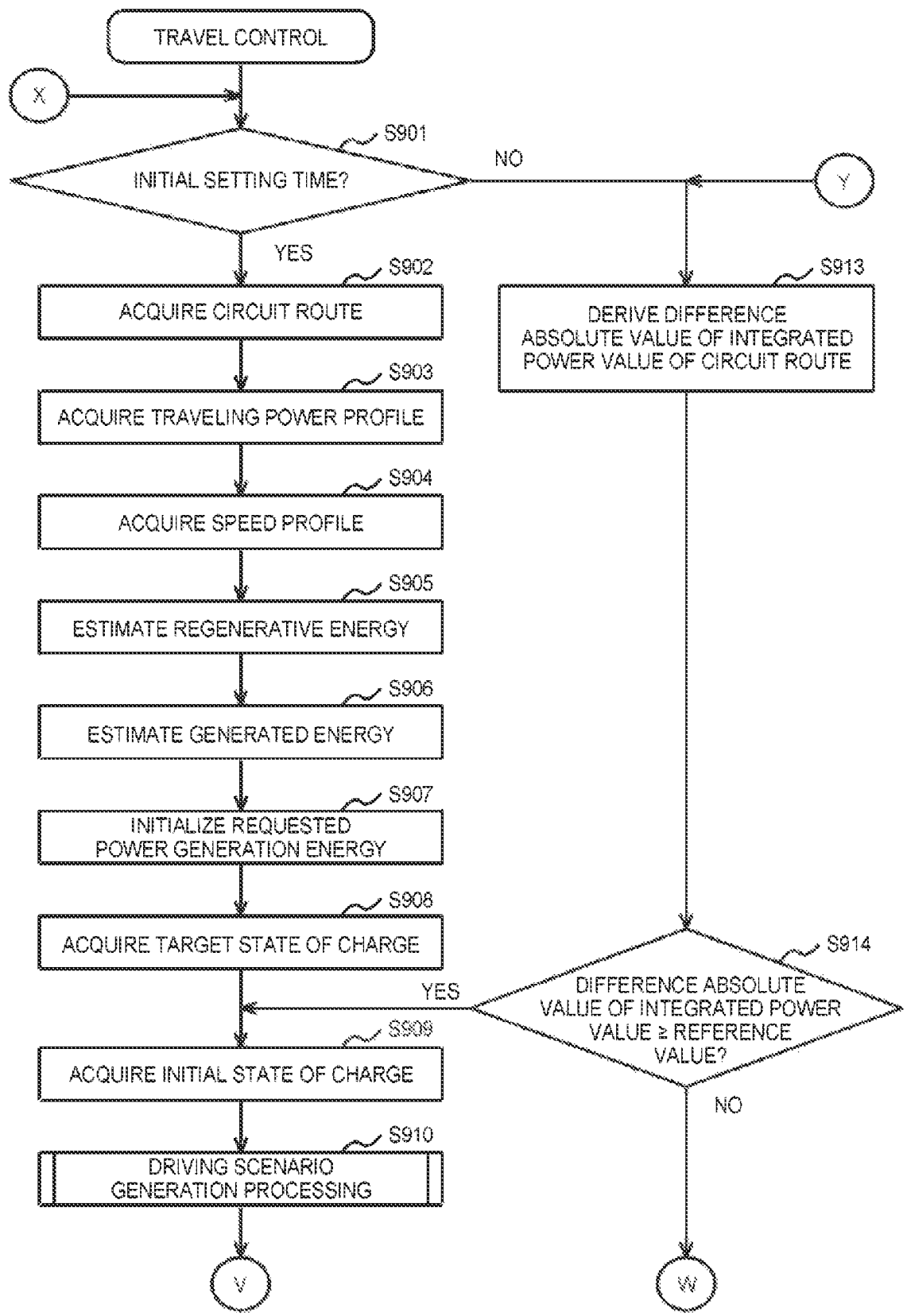
FIG. 9A is a flowchart of an example of travel control processing executed by the travel control device.
Figure 9B:
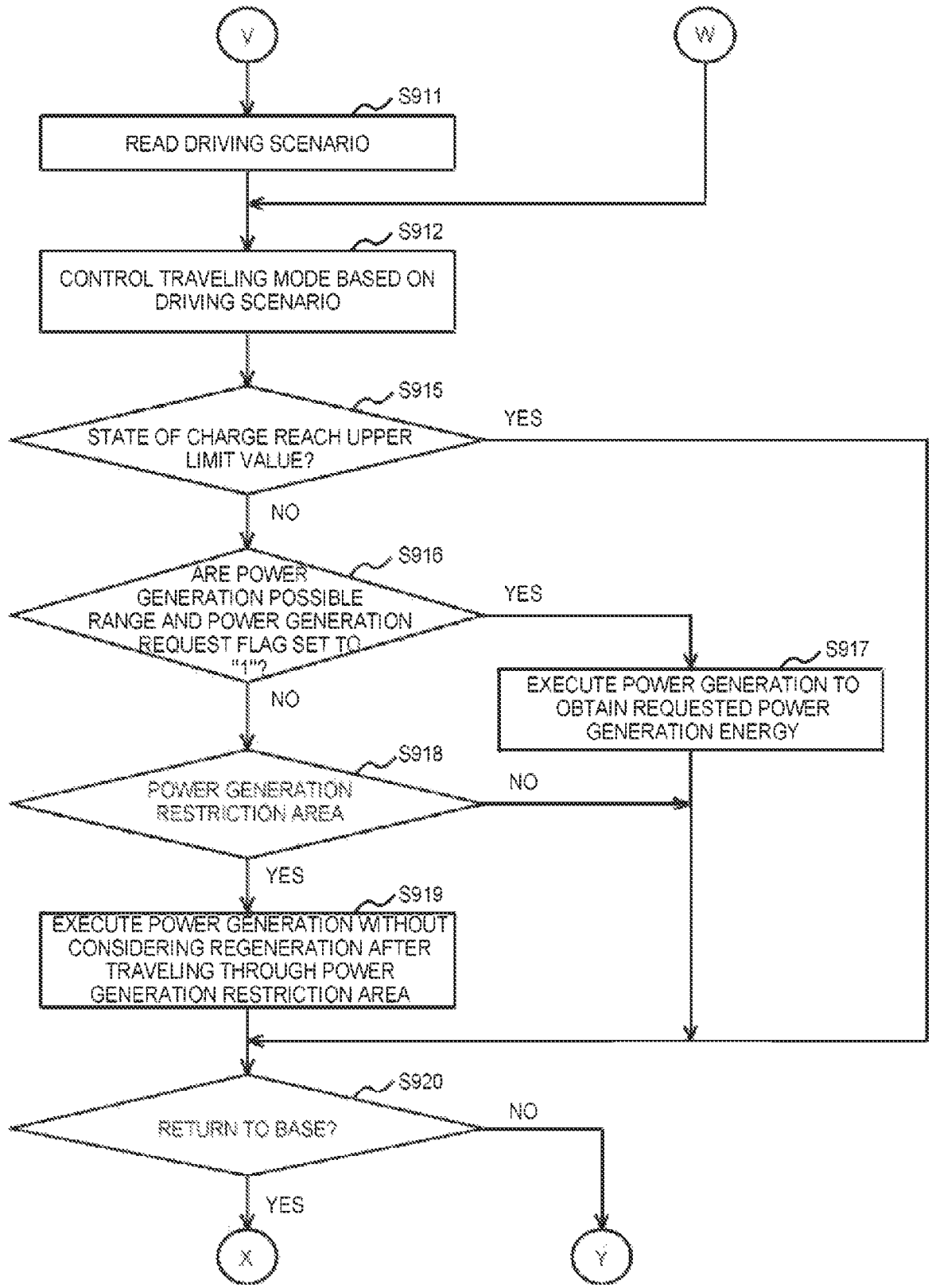
FIG. 9B is a flowchart of an example of the travel control processing executed by the travel control device.

FIGS. 9A and 9B are flowcharts illustrating an example of travel control executed by the travel control device 210. The processing of FIG. 9A and the processing of FIG. 9B are connected by connectors V, W, X, and Y. The travel control is started, for example, when a driver or the like turns on the power system of the vehicle 20 and starts a trip, and is executed until the trip ends with the power system of the vehicle 20 being turned off.

Step S901

The control unit 214 determines whether it is the initial setting time when control of the traveling mode based on the driving scenario has not yet started. When it is the initial setting time (S901, Yes), the process proceeds to step S902, and when it is not the initial setting time (S901, No), the process proceeds to step S913.

Step S902

The acquisition unit 211 acquires the circuit route for the vehicle 20. The circuit route for the vehicle 20 is provided by the information processing device 10. The acquisition unit 211 may acquire the circuit route via manual input by the driver of the vehicle 20 or the like, or may acquire the circuit route through automatic input by a navigation system mounted on the vehicle 20 or by remote operation from the information processing device 10. After the circuit route is acquired, the process proceeds to step S903.

Step S903

Figure 12:
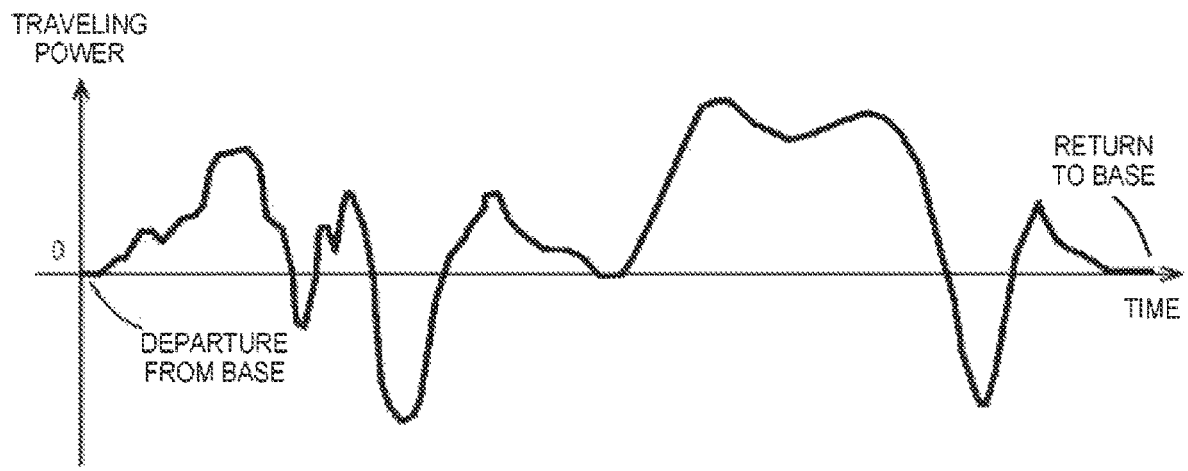
FIG. 12 is a diagram illustrating an example of a traveling power profile.

The acquisition unit 211 acquires a traveling power profile. The traveling power profile is power information that shows, in chronological order, expected changes in traveling power that occur in the power source (the internal combustion engine 221 and the electric motor 231) at each point in time while traveling when the vehicle 20 departs from the base, travels on the circuit route, and returns to the base. FIG. 12 illustrates an example of the traveling power profile. In FIG. 12, the horizontal axis represents the elapsed time from the start of traveling, and the vertical axis represents the traveling power. The traveling power profile acquired by the acquisition unit 211 is generated (or extracted) based on, for example, the information stored in the storage unit 310, that is, the past travel history on the same route as the circuit route or on each route forming the circuit route.

A simple generation example is described. For example, when the vehicle travels on the circuit route in substantially the same time period, it is conceivable that a plurality of past travel histories stored corresponding to the circuit route will have substantially the same pattern of changes in traveling power generated in the power source. In this case, a traveling power profile may be generated based on any one of the past histories. Furthermore, when attributes such as the day of the week and the time period of travel are added to the travel history, the traveling power profile may be generated based on the travel history that has a large number of attributes that match the current travel.

When there is a plurality of travel histories that are candidates for the traveling power profile, for example, any one of them may be used as the traveling power profile, or a traveling power profile obtained by averaging the travel histories may be used as the traveling power profile. Further, when the travel history is vehicle information (vehicle speed or the like) other than power information indicating changes in traveling power that occur in the power source during travel in time series, the traveling power profile may be generated based on the vehicle information. The method of generating the traveling power profile is not limited, and the methods may be combined as appropriate. After the traveling power profile is acquired, the process proceeds to step S904.

Step S904

Figure 14:
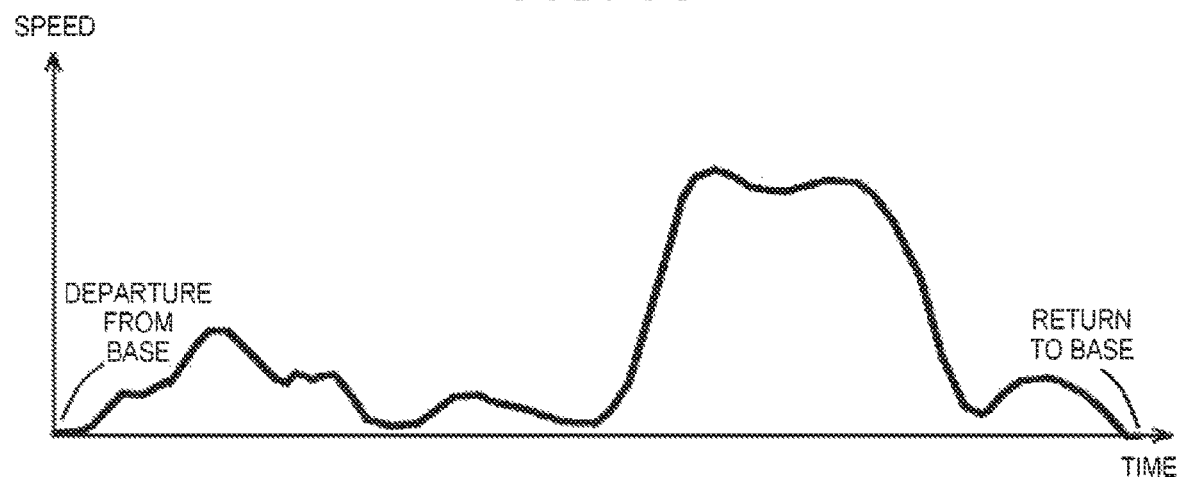
FIG. 14 is a diagram illustrating an example of a speed profile.

The acquisition unit 211 acquires the speed profile. The speed profile is information that shows, in chronological order, the expected speed of the vehicle 20 at each point in time while traveling when the vehicle 20 departs from the base, travels on the circuit route, and returns to the base. FIG. 14 illustrates an example of the speed profile. In FIG. 14, the horizontal axis represents the elapsed time from the start of traveling, and the vertical axis represents the speed of the vehicle 20.

The speed profile acquired by the acquisition unit 211 is generated (or extracted) based on the information stored in the storage unit 310, for example, the past travel histories on the same route as the circuit route or on each route forming the circuit route. In a simple example, when the traveling pattern of the driver (vehicle 20) is only a pattern of traveling on the same circuit route during the same time period on weekdays, the patterns of changes in speed over time included in the travel histories are considered to be approximately the same. In such cases, the acquisition unit 211 may create a speed profile based on any of the past travel histories. In addition, the storage unit 310 may classify and store attributes such as the day of the week and the time period of travel in association with the travel history, and the acquisition unit 211 may create a speed profile based on a travel history that has a large number of matches with attributes such as the day of the week and the time period of the current travel. After the speed profile is acquired, the process proceeds to step S905.

Step S905

Figure 13:
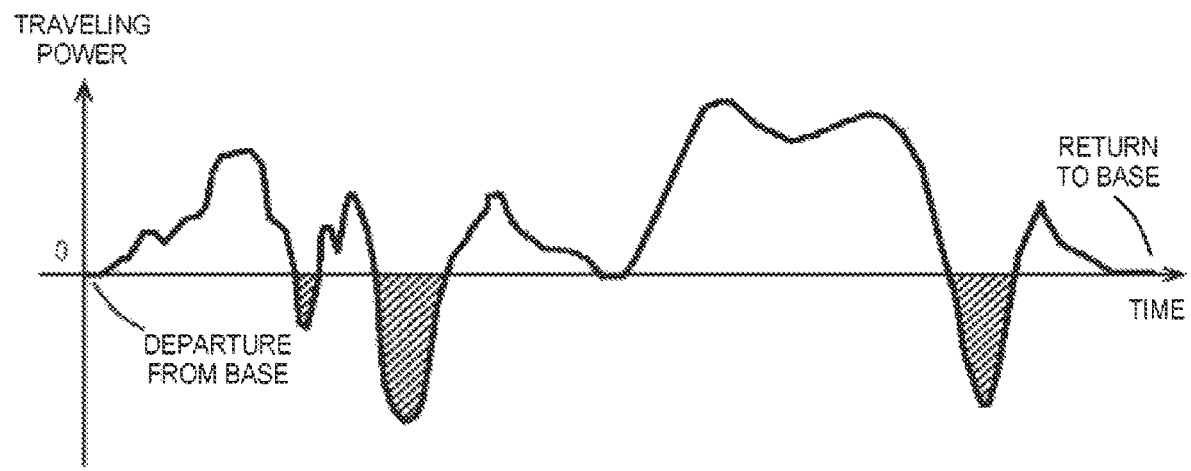
FIG. 13 is a diagram illustrating a regenerative energy region in the traveling power profile.

The estimation unit 212 estimates a regenerative energy E_est, which is the electrical energy obtained by the regenerative braking of the electric motor 231 during the period from when the vehicle 20 departs from the base, travels on the circuit route, and returns to the base. This regenerative energy E_est is estimated based on the traveling power profile. Specifically, the period during which the traveling power is negative (less than zero) in the traveling power profile is the period (recovery period) during which regenerative energy can be recovered, and the time integral value of the magnitude of the traveling power in the recovery period, that is, the area of the hatched regions in FIG. 13, is calculated as the estimated regenerative energy E_est. In estimating the regenerative energy E_est, the estimated value may be corrected in consideration of an increase in vehicle weight due to loading of cargo or the like, bad weather, and other variable factors. After the regenerative energy E_est is estimated, the process proceeds to step S906.

It is conceivable that the traveling power profile stored in the storage unit 310 as the past travel history is not actual data but approximate data due to restrictions on the amount of memory in the storage unit 310 or the like. In such a case, in order to improve the estimation accuracy of the regenerative energy E_est, the integrated value of negative traveling power may be stored as a travel history separately from the traveling power profile.

Step S906

Figure 15:
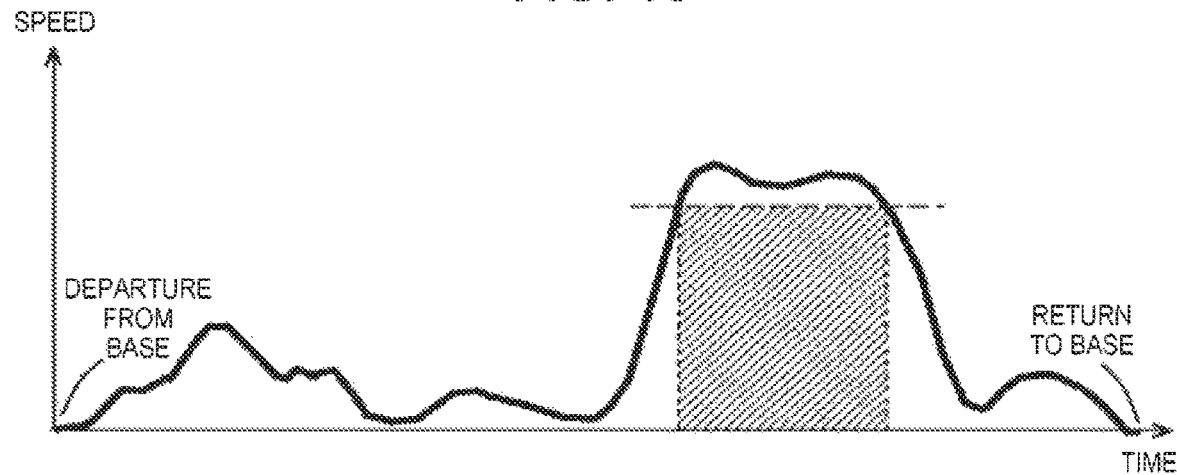
FIG. 15 is a diagram illustrating a region in which power generation is possible in the speed profile.

The estimation unit 212 estimates a generated energy E_gen, which is the electrical energy obtained by high-efficiency power generation in high-speed traveling during the period from when the vehicle 20 departs from the base, travels on the circuit route, and returns to the base. Estimation of the generated energy E_gen is performed based on the speed profile. Specifically, in the speed profile, the period of high-speed traveling in which the speed of the vehicle 20 exceeds a predetermined speed (for example, 100 km/h) is the period (electric power generation period) during which the internal combustion engine 221 is expected to be highly efficient, and the amount of electric power that can be generated during the electric power generation period, that is, the period indicated by hatching in FIG. 15, is calculated as the estimated generated energy E_gen. In estimating the generated energy E_gen, the estimated value may be corrected in consideration of an increase in vehicle weight due to loading of cargo or the like, bad weather, and other variable factors. After the generated energy E_gen is estimated, the process proceeds to step S907.

Step S907

The setting unit 213 is initialized by setting a requested power generation energy E_req to zero '0'. The requested power generation energy E_req is a variable that indicates how much electrical energy (electric power amount) should be obtained by forcibly generating power when the vehicle 20 is traveling at high speed. The requested power generation energy E_req is determined in a process of generating a driving scenario, which will be described below. After the requested power generation energy E_req is initialized to zero, the process proceeds to step S908.

Step S908

The acquisition unit 211 acquires a target state of charge SOC_tgt. The target state of charge SOC_tgt is the target state of charge (SOC) of the battery 241 when the vehicle 20 returns to the base. The target state of charge SOC_tgt can be the state of charge of the battery 241 desired by the driver or system of the vehicle 20. The acquisition unit 211 may acquire the target state of charge SOC_tgt via manual input by the driver of the vehicle 20 or the like, or may acquire the target state of charge SOC_tgt through automatic input by a navigation system mounted on the vehicle 20 or by remote operation from a control center outside the vehicle.

For example, since the battery 241 can be charged by a charging facility at the base, it is conceivable to set the target state of charge SOC_tgt lower than the standard value. In addition, when the vehicle is scheduled to leave for the next delivery immediately after returning to the base, it is conceivable to set the target state of charge SOC_tgt higher than the standard value. When the target state of charge SOC_tgt is acquired, the process proceeds to step S909.

Step S909

The acquisition unit 211 acquires an initial state of charge SOC_stt. The initial state of charge SOC_stt is the state of charge of the battery 241 at the time when the driving scenario is to be generated. When it is determined in step S901 that it is the initial setting time, the initial state of charge SOC_stt is the state of charge of the battery 241 at the start of driving when the driving scenario is generated for the first time. On the other hand, when it is determined in step S901 that it is not the initial setting time, the initial state of charge SOC_stt is the state of charge of the battery 241 in the middle of traveling (intermediate point) where the driving scenario is generated again. The acquisition unit 211 can acquire the initial state of charge SOC_stt of the battery 241 from the battery ECU 240 or the like. After the initial state of charge SOC_stt is acquired, the process proceeds to step S910.

Step S910

The setting unit 213 executes processing (driving scenario generation processing) for generating a driving scenario. The driving scenario is information that sets thresholds in chronological order for dividing the circuit route of the vehicle 20 into sections (hereinafter referred to as a "first section") to which the vehicle 20 travels only using the electric motor 231 and sections (hereinafter referred to as a "second section") to which the vehicle 20 travels using at least the internal combustion engine 221. The driving scenario generation processing will be described below. After the driving scenario is generated, the process proceeds to step S911.

Step S911

The control unit 214 reads the driving scenario generated by the driving scenario generation processing. After the driving scenario is read out, the process proceeds to step S912.

Step S912

The control unit 214 controls traveling modes of the vehicle 20 based on the driving scenario. More specifically, the control unit 214 determines a section in which the magnitude of the traveling power is equal to or less than the threshold of the driving scenario as the first section, and determines a section in which the magnitude of the traveling power exceeds the threshold of the driving scenario as the second section. In the first section, the control unit 214 selects the "electric motor mode" in which only the electric motor 231 is driven as the traveling mode, and notifies the travel control ECU 270 thereof. In response to the notification, the travel control ECU 270 causes the electric motor ECU 230 to control travel by the electric motor 231. In addition, in the second section, the control unit 214 selects, for example, the "internal combustion engine mode" in which only the internal combustion engine 221 is driven as the traveling mode, and notifies the travel control ECU 270 thereof. In response to the notification, the travel control ECU 270 causes the internal combustion engine ECU 220 to control travel by the internal combustion engine 221.

In the electric motor mode, regenerative braking is performed by the electric motor 231 and the kinetic energy of the vehicle 20 is recovered as electric power. When the driver depresses the brake pedal strongly, or the driving support ECU 280 issues a high-priority rapid deceleration instruction to avoid a collision or the like, and a certain level of deceleration is requested, in order to generate sufficient braking force, the manager ECU 300 and the brake ECU 260 control the brake device 261 to generate the braking force.

In the embodiment, an example is described in which the driving scenario sets the traveling mode of the second section to the internal combustion engine mode in which only the internal combustion engine 221 is driven for traveling. However, in hybrid traveling, since the state of charge of the battery 241 is controlled to be almost constant, instead of the internal combustion engine mode, a "hybrid mode" that drives at least the internal combustion engine 221 for traveling may be selected as the traveling mode of the second section.

Step S913

The derivation unit 215 derives a difference absolute value $E\_d(t)$ of the integrated power value from the base (t=0) to the current point (t=T). The difference absolute value $E\_d(t)$ of the integrated power value is a numerical value indicating the absolute value of the difference between an integrated value $\Sigma P\_present(t)$ of the magnitude of the traveling power obtained by actual traveling of the vehicle 20 and an integrated value $\Sigma P\_past(t)$ of the magnitude of the traveling power calculated based on the traveling power profile, as illustrated in the following formula [2]. The difference absolute value $E\_d(t)$ of the integrated power value is derived at regular intervals, for example, after the vehicle 20 departs the base. After the difference absolute value $E\_d(t)$ of the integrated power value is derived, the process proceeds to step S914.

$$E\_d(t)=|\Sigma P\_past(t)\_\Sigma P\_present(t)| \quad [2]$$

Step S914

The control unit 214 determines whether the difference absolute value $E\_d(t)$ of the integrated power value derived by the derivation unit 215 exceeds a reference value C. The determination is made in order to reconsider whether the driving scenario needs to be revised. Therefore, the reference value C is set to, for example, an appropriate predetermined value at which it can be determined that the driving scenario needs to be regenerated when the change in traveling power based on the driving scenario generated at the base diverges significantly from the traveling power profile set based on the past travel history. When the difference absolute value $E\_d(t)$ of the integrated power value exceeds the reference value C ($E\_d(t)>C$) (S914, Yes), the process proceeds to step S909 to regenerate the driving scenario. On the other hand, when the difference absolute value $E\_d(t)$ of the integrated power value does not exceed the reference value C ($E\_d(t) C$) (S914, No), the process proceeds to step S912 to continue the traveling mode control according to the current driving scenario.

Step S915

The control unit 214 determines whether the state of charge of the battery 241 has reached an upper limit value. The upper limit value can be, for example, the state of charge at which the battery 241 can be overcharged. When the state of charge of the battery 241 has reached the upper limit value (S915, Yes), the process proceeds to step S920. On the other hand, if the charge rate of the battery 241 has not reached the upper limit (S915, No), the process proceeds to step S916.

Step S916

The control unit 214 determines whether the vehicle 20 is traveling in a range in which power generation is possible and whether a power generation request flag XF is set to "1". It is determined whether the state of the vehicle 20 meets the conditions for forced power generation. The range in which power generation is possible means the area to which the vehicle 20 is traveling at high speed (for example, 100 km/h or more) where the internal combustion engine 221 can be used with high efficiency, and where efficient power generation is possible in the internal combustion engine mode. The power generation request flag XF is a flag indicating whether it is necessary to intentionally (forcibly) increase the amount of power generation during the period from when the vehicle 20 departs the base, travels the circuit route, and returns to the base. The power generation request flag XF is set to "1" or "0" as necessary in the process of generating a driving scenario, which will be described below. When the vehicle 20 is in the range in which power generation is possible and the power generation request flag XF is set to 1 (S916, Yes), the process proceeds to step S917. On the other hand, when the vehicle 20 is not in the range in which power generation is possible or the power generation request flag XF is not 1 (S916, No), the process proceeds to step S918.

Step S917

The control unit 214 performs power generation using the electric motor 231 and other power generators (not illustrated) so as to obtain the requested power generation energy $E\_req$ determined in processing for generating a driving scenario, which will be described below. When power generation for obtaining the requested power generation energy $E\_req$ is executed, the process proceeds to step S920.

Step S918

The control unit 214 determines whether the vehicle 20 is traveling in a power generation restriction area. The power generation restriction area is an area in which a large amount of electrical energy can be expected to be recovered after the vehicle travels the area. An example of the power generation restriction area is a predetermined section before an exit interchange of an expressway where it can be expected that regenerative energy will be generated by deceleration. When the area in which the vehicle is traveling is the power generation restriction area (S918, Yes), the process proceeds to step S919. On the other hand, when the area in which the vehicle is traveling is not the power generation restriction area (S918, No), the process proceeds to step S920.

Step S919

The control unit 214 executes power generation without considering regeneration (power generation) after the vehicle 20 travels through the power generation restriction area. Generally, in the power generation restriction area, in order to efficiently recover the electrical energy that can be expected to be obtained after vehicle 20 travels the area, power generation is reduced while the vehicle is traveling in the area, and the state of charge of the battery 241 is lowered in advance. In the present embodiment, power generation during travel in the power generation restriction area, which is normally reduced, is not reduced. As a result, in addition to efficiently recovering electrical energy that can be expected to be obtained after the power generation restriction area, highly efficient electrical energy can be generated by power generation while traveling in the power generation restriction area. When power generation is executed without considering regeneration after traveling in the power generation restriction area, the process proceeds to step S920.

Step S920

The control unit 214 determines whether the vehicle 20 has returned to the base. When the vehicle 20 has returned to the base (S920, Yes), the process proceeds to step S901 to generate a driving scenario for the next circuit route. On the other hand, when the vehicle 20 has not yet returned to the base (S920, No), the process proceeds to step S913 to reconsider whether the current driving scenario needs to be revised.

In addition, in the travel control processing, the traveling power profile (obtained in step S903) and the speed profile (obtained in step S904) may be obtained by extracting them from a database pre-stored in the storage unit 150 of the information processing device 10. Alternatively, the information processing device 10 may generate a traveling power profile and a speed profile, and provide each profile generated by the information processing device 10 to the travel control device 210. In addition, in order to reduce the computational load on the vehicle 20 (travel control device 210) side, the information processing device 10 may execute part of the travel control processing (for example, steps S902 to S909).

Figure 10A:
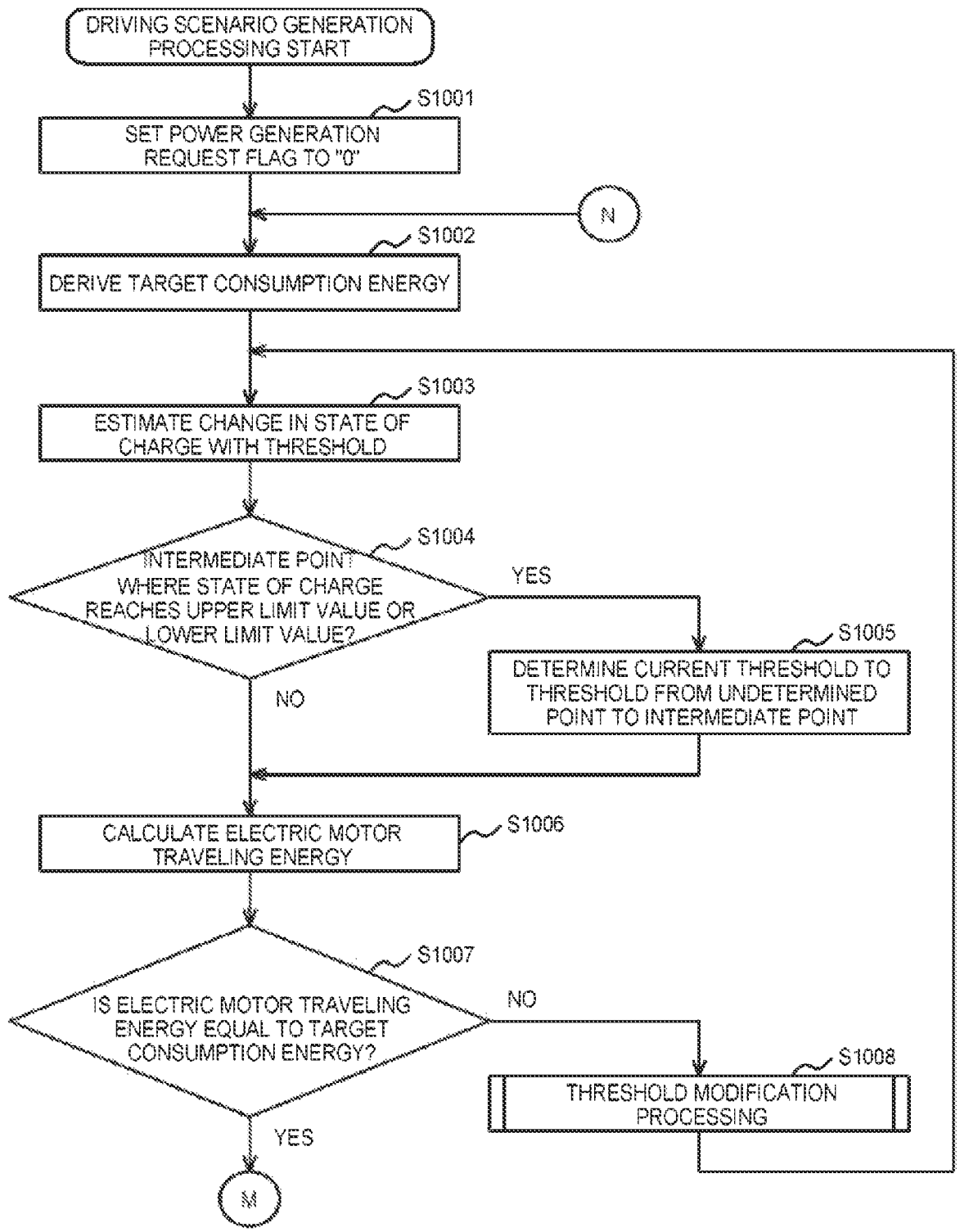
FIG. 10A is a flowchart of an example of driving scenario generation processing executed by the travel control device.
Figure 10B:
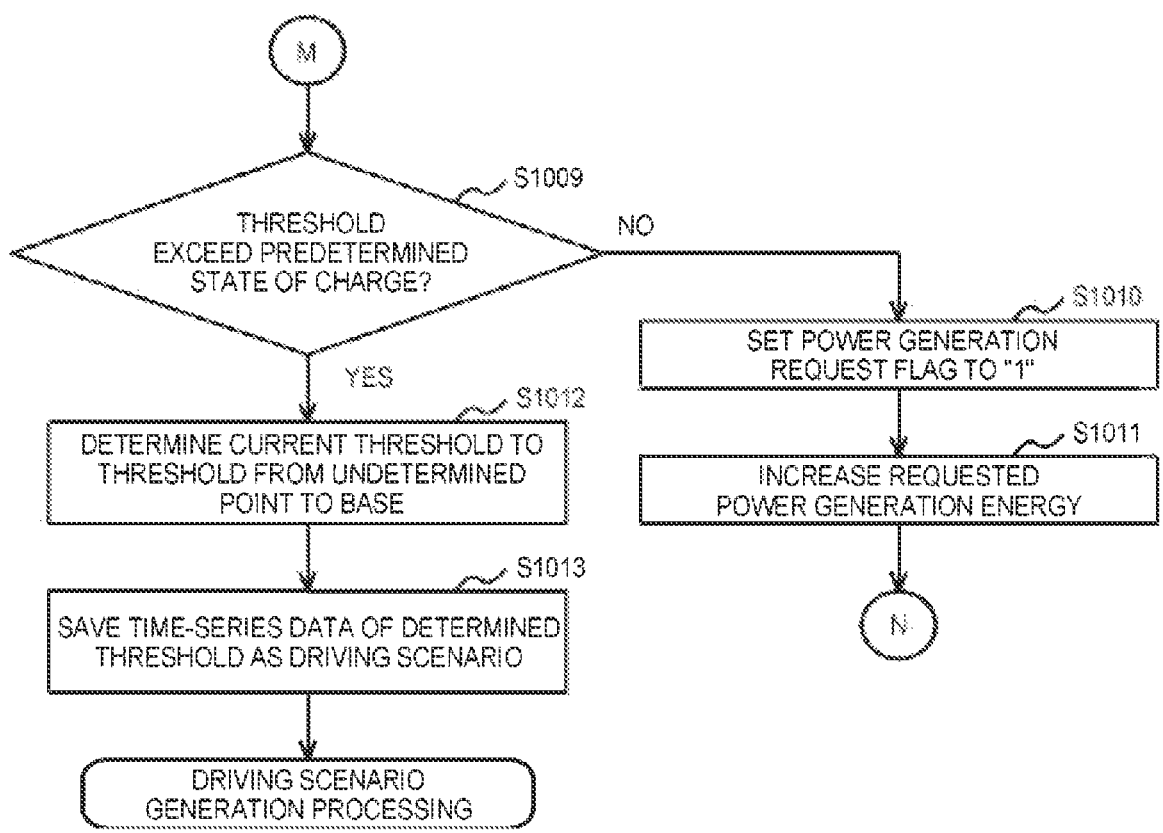
FIG. 10B is a flowchart of an example of the driving scenario generation processing executed by the travel control device.

The driving scenario generation processing illustrated in step S910 of FIG. 9A will be described with reference to FIGS. 10A and 10B. FIGS. 10A and 10B are flowcharts illustrating an example of the driving scenario generation processing executed by the travel control device 210. The processing in FIG. 10A and the processing in FIG. 10B are connected by connectors M and N.

Step S1001

The setting unit 213 is initialized by setting the power generation request flag XF to "0". When the power generation request flag XF is set to "0", the process proceeds to step S1002.

Step S1002

The setting unit 213 derives a target consumption energy $E\_tgt$. The target consumption energy $E\_tgt$ is the electrical energy consumed by the traveling of the vehicle 20 to bring the state of charge of the battery 241 to the target state of charge $SOC\_tgt$ when the vehicle 20 returns to the base. The target consumption energy $E\_tgt$ is derived by the following formula [3] based on the estimated regenerative energy $E\_est$, the estimated generated energy $E\_gen$, the requested power generation energy $E\_req$, the initial state of charge $SOC\_stt$, and a full charge capacity $C\_f$ of the battery 241. After the target consumption energy $E\_tgt$ is derived, the process proceeds to step S1003.

$$E\_tgt = E\_est + E\_gen + E\_req + (SOC\_stt - SOC\_tgt) \times C\_f \quad [3]$$

Step S1003

The setting unit 213 applies a threshold $P\_swt$ to the traveling power profile to estimate the expected change in a state of charge $SOC\_clc$ of the battery 241 until the vehicle 20 returns from the current point to the base. The threshold $P\_swt$ is a traveling power value that provides timing for switching between the first section in which only the electric motor 231 is driven for vehicle travel and the second section in which at least the internal combustion engine 221 is driven for vehicle travel. The threshold $P\_swt$ can take values between zero and the maximum power that the vehicle 20 can output. The threshold $P\_swt$ is preset to an initial value in which the first section is an area of low traveling power where the efficiency of the internal combustion engine 221 is poor, and the initial value is appropriately modified according to the content of the process. The current point will be the base from which the vehicle 20 departs in the driving scenario generation processing that is executed during the initial settings. When the change in the state of charge $SOC\_clc$ of the battery 241 is estimated, the process proceeds to step S1004.

Figure 16:
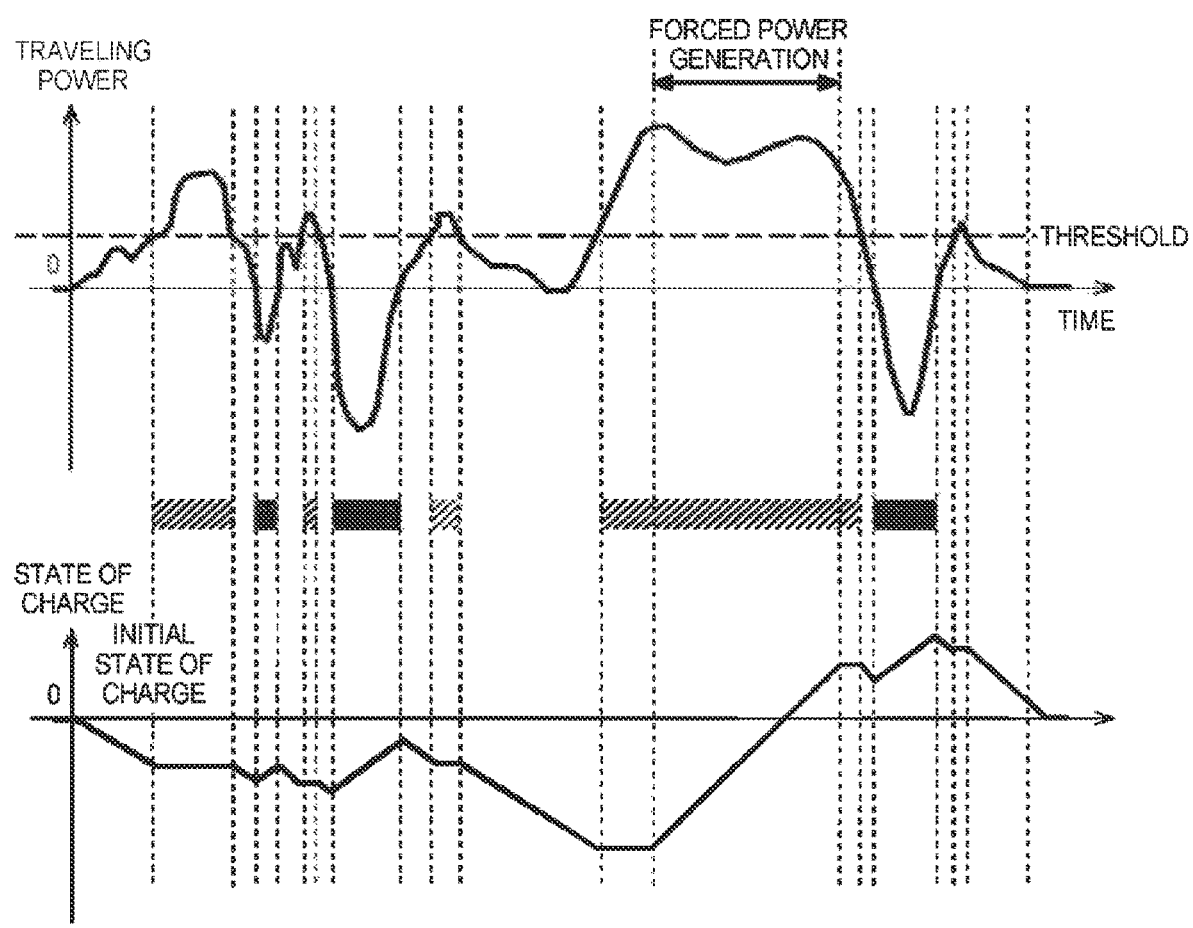
FIG. 16 is a diagram illustrating an example of changes in a battery state of charge (without a target state of charge)
Figure 17:
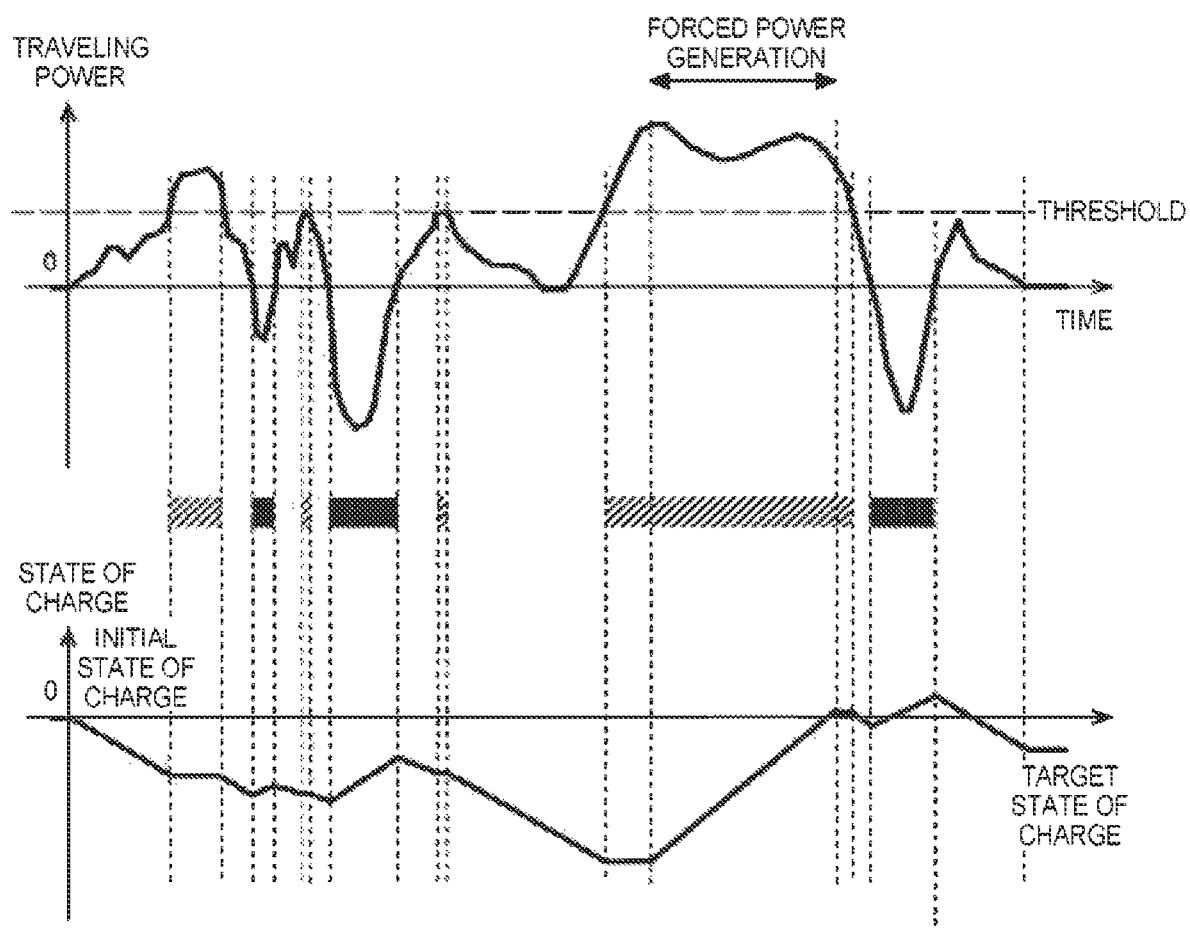
FIG. 17 is a diagram illustrating an example of changes in the battery state of charge (with a target state of charge).

FIGS. 16 and 17 illustrate an example of changes in the state of charge $SOC\_clc$ of the battery 241 estimated based on the traveling power. FIG. 16 exemplifies changes in the state of charge $SOC\_clc$ of the battery 241 when there is no target state of charge $SOC\_tgt$ upon returning to the base. FIG. 17 exemplifies changes in the state of charge $SOC\_clc$ of the battery 241 when there is a target state of charge $SOC\_tgt$ upon returning to the base.

As exemplified in FIGS. 16 and 17, in the traveling power profile, in the first section (the period not hatched or shaded in the figures) where the traveling power is equal to or greater than zero and equal to or less than the threshold, electric power is consumed by the power running control of the electric motor 231, such that the state of charge $SOC\_clc$ of the battery 241 decreases. On the other hand, in the first section (the hatched period in the figures) where the traveling power is less than zero, the electric motor 231 performs regenerative braking, such that the electric power is charged and the state of charge $SOC\_clc$ of the battery 241 increases. In addition, in the second section (shaded period in the figures) where the threshold in the traveling power profile is exceeded, in principle, the electric motor 231 does not consume electric power, such that the state of charge $SOC\_clc$ of the battery 241 is maintained. However, during the period of high-speed traveling, the charging by forced power generation increases the state of charge $SOC\_clc$ of the battery 241.

Step S1004

The setting unit 213 determines whether there is an intermediate point where the state of charge $SOC\_clc$ reaches the upper limit value or lower limit value allowed for the battery 241 in the state of charge $SOC\_clc$ of the battery 241 estimated to change from the current point to the base. The allowable upper limit value of the battery 241 is, for example, a state of charge that causes an overcharged state, and the allowable lower limit value of the battery 241 is, for example, a state of charge that causes an overdischarge state. When there is an intermediate point where the state of charge $SOC\_clc$ reaches the allowable upper limit value or the allowable lower limit value (S1004, Yes), the process proceeds to step S1005. On the other hand, when there is no intermediate point where the state of charge $SOC\_clc$ reaches the allowable upper limit value or the allowable lower limit value (S1004, No), the process proceeds to step S1006.

Step S1005

The setting unit 213 determines (decides) the current threshold $P\_swt$ as the normal threshold applied from a threshold undetermined point to the intermediate point. The threshold undetermined point in the step is a current point when the intermediate point in this time is the intermediate point where the state of charge $SOC\_clc$ first reaches the allowable upper limit value or allowable lower limit value of the battery 241. However, the threshold undetermined point is the previous intermediate point when the state of charge $SOC\_clc$ reaches the allowable upper limit value or allowable lower limit value of the battery 241 two or more times. There is no limit to the number of intermediate points. After the threshold from the undetermined point to the intermediate point is determined, the process proceeds to step S1006.

Step S1006

The setting unit 213 calculates an estimated value of an electric motor traveling energy $E\_mg$ consumed by the electric motor 231 until the vehicle 20 returns from the current point to the base based on the state of charge $SOC\_clc$ of the battery 241 of which change is estimated. The electric motor traveling energy $E\_mg$ is calculated based on the integrated value of the traveling power in the first section where the traveling power is equal to or greater than zero in the traveling power profile to which the current threshold $P\_swt$ is applied. When there is a threshold determined in step S1005, the current threshold $P\_swt$ and the determined threshold are applied to the corresponding period to calculate the electric motor traveling energy $E\_mg$. After the electric motor traveling energy $E\_mg$ is calculated, the process proceeds to step S1007.

Step S1007

The setting unit 213 determines whether the electric motor traveling energy $E\_mg$ is equal to the target consumption energy $E\_tgt$ ($E\_mg=E\_tgt$). It is determined whether the target consumption energy $E\_tgt$ can be consumed in just the right amount at the current threshold $P\_swt$. When the electric motor traveling energy $E\_mg$ is equal to the target consumption energy $E\_tgt$ (S1007, Yes), the process proceeds to step S1009. On the other hand, when the electric motor traveling energy $E\_mg$ is not equal to the target consumption energy $E\_tgt$ (S1007, No), the process proceeds to step S1008.

Step S1008

The setting unit 213 executes processing (threshold modification processing) to modify the current threshold $P\_swt$. The threshold modification processing will be described below. After the threshold $P\_swt$ is modified, the process proceeds to step S1003.

Step S1009

The setting unit 213 determines whether the current threshold $P\_swt$ exceeds a value $C\_p$ of a predetermined traveling power. The value $C\_p$ is the traveling power at which the efficiency of the internal combustion engine 221 is poor, and indicates that when the value $C\_p$ is not exceeded, it is necessary to intentionally increase the amount of power generation. When the threshold $P\_swt$ exceeds the value $C\_p$ (S1009, Yes), the process proceeds to step S1012. On the other hand, when the threshold $P\_swt$ does not exceed the value $C\_p$ (S1009, No), the process proceeds to step S1010.

Step S1010

The setting unit 213 sets the power generation request flag XF to "1". When the power generation request flag XF is set to "1", the process proceeds to step S1011.

Step S1011

The setting unit 213 increases the requested power generation energy $E\_req$. More specifically, the setting unit 213 increases it by adding a small amount of energy $\Delta E$ to the previous requested power generation energy $E\_req$ ($E\_req \leftarrow E\_req+\Delta E$). The small amount of energy $\Delta E$ can be arbitrarily set based on the speed and resolution required for this process. When the requested power generation energy $E\_req$ is increased, the process proceeds to step S1002.

Step S1012

The setting unit 213 determines (decides) the current threshold $P\_swt$ as a normal threshold applied from the threshold undetermined point to the base. The threshold undetermined point in the step is the current point when the state of charge $SOC\_clc$ changes without reaching the allowable upper limit value or allowable lower limit value of the battery 241 even once. On the other hand, when the state of charge $SOC\_clc$ reaches the allowable upper limit value or allowable lower limit value of the battery 241 at least once, the threshold undetermined point is the intermediate point where the allowable upper limit value or the allowable lower limit value is finally reached. After the threshold from the undetermined point to the base is determined, the process proceeds to step S1013.

Step S1013

The setting unit 213 generates data in which one or more threshold values determined in steps S1005 and S1012 are connected in time series, and then saves the generated data as a driving scenario that is applied to the traveling when the vehicle 20 departs from the base, travels on the circuit route, and returns to the base. When the driving scenario is saved, the driving scenario generation processing ends.

Figure 11:
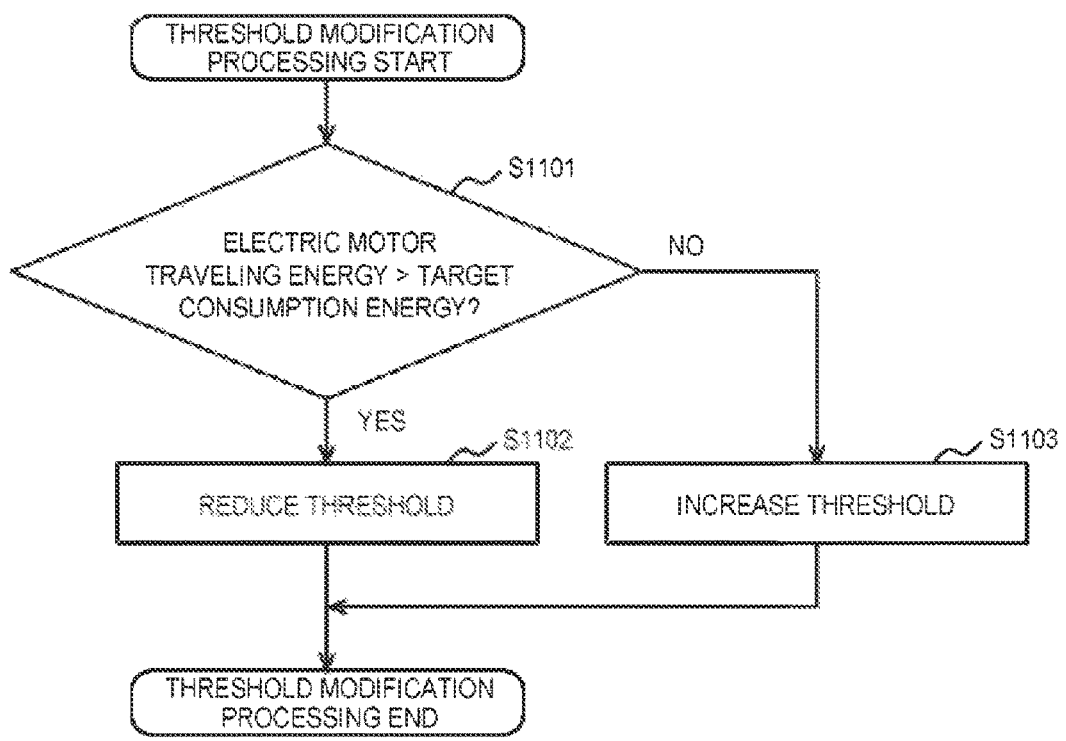
FIG. 11 is a flowchart of an example of threshold modification processing executed by the travel control device.

The threshold modification processing illustrated in step S1008 in FIG. 10A will be described with reference to FIG. 11. FIG. 11 is a flowchart illustrating an example of the threshold modification processing executed by the travel control device 210.

Step S1101

The setting unit 213 determines whether the electric motor traveling energy $E\_mg$ is greater than the target consumption energy $E\_tgt$ ($E\_mg>E\_tgt$). It is determined how the threshold $P\_swt$ should be modified. When the electric motor traveling energy $E\_mg$ is greater than the target consumption energy $E\_tgt$ (S1101, Yes), the process proceeds to step S1102. On the other hand, when the electric motor traveling energy $E\_mg$ is not greater than the target consumption energy $E\_tgt$ (S1101, No), the process proceeds to step S1103.

Step S1102

The setting unit 213 reduces the threshold $P\_swt$ because there is a shortage of the electrical energy even when all the estimated regenerative energy $E\_est$ is consumed. Specifically, the setting unit 213 changes the current threshold $P\_swt$ to a value that is reduced by a small amount of power $\Delta P$ ($P\_swt \leftarrow P\_swt-\Delta P$). The small amount of power $\Delta P$ can be arbitrarily set based on the performance of the power source, the difference between the electric motor traveling energy $E\_mg$ and the target consumption energy $E\_tgt$. In addition, as a method of reducing the threshold $P\_swt$ in step S1102, in addition to the method of reducing the threshold $P\_swt$ by the amount of power $\Delta P$, which is a fixed value, a method ($P\_swt<(P\_swt+P\_swt\_min)/2$) of setting an intermediate value between the current threshold $P\_swt$ and a lower limit threshold $P\_swt\_min$, which is the minimum settable threshold, as the modified threshold may be used (binary search method). When the threshold $P\_swt$ is reduced, the threshold modification processing ends.

Step S1103

The setting unit 213 increases the threshold $P\_swt$ because the estimated regenerative energy $E\_est$ cannot be completely consumed. Specifically, the setting unit 213 changes the current threshold $P\_swt$ to a value that is increased by a small amount of power $\Delta P$ ($P\_swt \leftarrow P\_swt+\Delta P$). The small amount of power $\Delta P$ can be arbitrarily set based on the performance of the power source, the difference between the electric motor traveling energy $E\_mg$ and the target consumption energy $E\_tgt$. Further, as a method for increasing the threshold $P\_swt$ in step S1103, in addition to the method of increasing the threshold $P\_swt$ by the amount of power $\Delta P$, which is a fixed value, a method ($P\_swt \leftarrow (P\_swt+P\_swt\_max)/2$) of setting an intermediate value between the current threshold $P\_swt$ and an upper limit threshold $P\_swt\_max$, which is the maximum settable threshold, as the modified threshold may be used (binary search method). When the threshold P_swt is increased, the threshold modification processing ends.

When generating the driving scenario, depending on the acquired traveling power profile, speed profile, and initial state of charge SOC_stt, there is a possibility that it may not be possible to achieve both the consumption of all the estimated regenerative energy E_est and the acquisition of the target state of charge SOC_tgt when the vehicle 20 returns to the base. In such a case, the driving scenario may be generated by giving priority to either consumption of all the estimated regenerative energy E_est or acquisition of the target state of charge SOC_tgt when the vehicle 20 returns to the base. Alternatively, the driving scenario may be generated by prioritizing that the state of charge SOC_clc does not reach the allowable upper limit value or the allowable lower limit value.

By the processing in the vehicle 20 described above, it is possible to generate a driving scenario where the change in power consumption, the amount of regenerative energy E_est recovered, and the highly efficient generated energy E_gen in one trip in which the vehicle 20 departs from the base, travels on the circuit route, and returns to the base are estimated, and based on these estimations, fuel efficiency can be improved while aiming to achieve both efficient consumption of the target consumption energy E_tgt including consumption of all of the estimated regenerative energy E_est and acquisition of the target state of charge SOC_tgt when the vehicle 20 returns to the base. In addition, when the deviation between the estimated value and the value obtained by actual traveling becomes large, the driving scenario is revised, such that optimum travel control can always be achieved.

Operations and Effects

As described above, with the information processing device according to the present embodiment, by using delivery destination data indicating information on a plurality of circuit points that are delivery destinations and road/traffic environment data indicating information regarding a route between two circuit points of the circuit points that the vehicle can travel to, a circuit route indicating the optimal order of circuit points for a vehicle by which a circuit of the circuit points is made is determined while taking into consideration real-time traffic information regarding the traveling route of the vehicle. In this case, the information processing device determines a circuit route that minimizes the fuel consumption of the vehicle based on the difference in the amount of energy consumed in low-speed traveling by the electric motor and high-speed traveling by the internal combustion engine. Through the processing, it is possible to determine a circuit route suitable for improving fuel efficiency in the hybrid vehicle.

In addition, with the travel control device according to the present embodiment, the amount of regenerative energy recovered is quantitatively estimated at an early stage by using the traveling power profile, which shows, in chronological order, the expected changes in traveling power occurring in the power source during the vehicle traveling on the circuit route determined by the information processing device. In addition, by using a speed profile showing, in chronological order, the expected vehicle speed during the vehicle traveling on the circuit route, the generated energy that can be obtained by high-efficiency power generation during high-speed traveling is estimated. Therefore, by utilizing the estimation results, it is possible to perform suitable vehicle travel control in consideration of the target state of charge of the battery.

Then, the travel control device controls such that the vehicle travels by driving the electric motor in the traveling condition where the engine efficiency is low, and the internal combustion engine can be driven in the high efficiency range as much as possible. In addition, when it can be estimated that there is a large amount of regenerative energy, such as when going downhill, the travel control device lowers the state of charge of the battery in advance to eliminate or reduce unrecovered energy. In addition, the travel control device actively controls power generation during high-speed traveling where the engine efficiency is good, increasing the period during which the vehicle can travel using the electric motor, thereby improving fuel efficiency. Furthermore, since the travel control device controls the traveling mode by setting the first section and the second section such that the state of charge of the battery does not exceed the allowable upper limit value and does not fall below the allowable lower limit value, it is possible to prevent deterioration of the battery. Through the controls, the fuel efficiency can be favorably improved while achieving both efficient consumption of the target consumption energy including consumption of all the estimated regenerative energy and acquisition of the target state of charge when the vehicle returns to the base.

Although an embodiment of the present disclosure is described above, the present disclosure can be understood not only as an information processing device, but also as a method or a program executed by an information processing device including a processor and a memory, a computer-readable non-temporary storage medium storing a program, a system including an information processing device and a vehicle, and the like.

The information processing device and the like of the present disclosure can be used, for example, when it is desirable to provide information regarding travel to a vehicle.

What is claimed is:

1. A system comprising:
   a vehicle that is equipped with an electric motor and an internal combustion engine as power sources; and
   an information processing device that is configured to determine a route for the vehicle by which a circuit of a plurality of points is made, wherein the information processing device includes processing circuitry configured to:
   acquire information regarding the points;
   determine a circuit route that minimizes fuel consumption of the vehicle for the points based on the information regarding the points;
   transmit the circuit route to the vehicle;
   acquire a traveling power profile that is power information that shows expected changes in traveling power that occur in the respective power sources at each point in time while the vehicle is traveling on the circuit route;
   estimate a regenerative energy that is an energy obtained by a regenerative braking of the electric motor and by at least one of an increase in weight of the vehicle due to loading of cargo or bad weather;
   set a first section in which the vehicle is to travel by driving the electric motor and a second section in which the vehicle is to travel by driving the internal combustion engine, based on at least the regenerative energy and a target state of charge after the vehicle travels the circuit route; and
   control travel of the vehicle based on the first section and the second section.

2. The system according to claim 1, wherein the processing circuitry is further configured to set the first section and the second section such that energy consumed while traveling in the first section is generated while traveling in the second section.

3. The system according to claim 1, wherein the point information includes at least one of a distance, a road type, a gradient, and the number of traffic lights between each pair of travelable points from among the points.

4. The system according to claim 3, wherein the road type includes a general road and an expressway.

* * * * *